US008051327B2

(12) United States Patent
Seaton

(10) Patent No.: US 8,051,327 B2
(45) Date of Patent: Nov. 1, 2011

(54) CONNECTION BETWEEN MACHINES AND POWER SOURCE

(75) Inventor: Scott T. Seaton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 132 days.

(21) Appl. No.: 12/259,674

(22) Filed: Oct. 28, 2008

(65) Prior Publication Data

US 2010/0102633 A1     Apr. 29, 2010

(51) Int. Cl.
*G06F 11/00* (2006.01)
(52) U.S. Cl. ............................. 714/14; 307/64; 713/340
(58) Field of Classification Search .................... 714/14; 307/64, 65; 713/340
See application file for complete search history.

(56) References Cited

U.S. PATENT DOCUMENTS

| | | | |
|---|---|---|---|
| 5,381,554 A | | 1/1995 | Langer et al. |
| 5,751,564 A | | 5/1998 | Dien |
| 5,781,716 A | | 7/1998 | Hemphill et al. |
| 6,195,754 B1 * | | 2/2001 | Jardine et al. ............... 713/324 |
| 6,433,444 B1 * | | 8/2002 | de Vries ....................... 307/64 |
| 6,618,821 B1 | | 9/2003 | Duncan et al. |
| 7,036,035 B2 * | | 4/2006 | Allison et al. ............... 713/340 |
| 7,500,120 B2 * | | 3/2009 | Egan et al. .................. 713/300 |
| 7,653,827 B2 * | | 1/2010 | Dobbs et al. ................ 713/340 |
| 7,679,217 B2 * | | 3/2010 | Dishman et al. ............ 307/64 |
| 7,721,125 B2 * | | 5/2010 | Fung ........................... 713/320 |
| 2005/0229037 A1 * | | 10/2005 | Egan et al. .................. 714/14 |
| 2007/0217125 A1 | | 9/2007 | Johnson |
| 2008/0030078 A1 | | 2/2008 | Whitted et al. |
| 2008/0034256 A1 | | 2/2008 | Mosman |
| 2010/0064170 A1 * | | 3/2010 | Gross et al. ................. 714/14 |

OTHER PUBLICATIONS

"3 Phase UPS Systems—Advantages/Disadvantages?", Retrieved at <<http://www.apc-forums.com/thread.jspa?messageID=286>>, Mar. 8, 2007, pp. 3.
"PowerChute Network Shutdown Solutions for Single, Dual- and Triple-Corded Servers" Retrieved at <<http://www.apcmedia.com/salestools/BKIR-6DZPTG_R0_EN.pdf>>, dated: 2006, pp. 1-6.
McCarthy, Kevin, "Comparing UPS System Design Configurations", Retrieved at <<http://www.apcmedia.com/salestools/SADE-5TPL8X_R1_EN.pdf>>, White Paper No. 75, dated: 2005, pp. 1-27.

* cited by examiner

*Primary Examiner* — Marc Duncan

(57) ABSTRACT

Machines may be connected to power distribution units (PDU/STSs) in such a way that if one PDU/STS fails or is taken out of service, the machines' loads are shifted more-or-less evenly to the other PDU/STSs. Several PDU/STSs may be provided for a group of dual-corded machines. The two cords of each machine are connected to a pair of PDU/STSs. Different pairs of PDU/STSs may be used for different machines. In normal operation, each machine may draw part of its power through each of the two cords. If one PDU/STS to which a machine is connected fails or is taken out of service, the entire load on that machine may be shifted to its remaining cord. Since redistribution may be approximately even across PDU/STSs, tolerance for one PDU/STS failure can be implemented with relatively little over-sizing of the PDU/STSs.

19 Claims, 5 Drawing Sheets

CONNECTION BETWEEN MACHINES AND POWER SOURCE

BACKGROUND

Many computers operate under some expectation of fault tolerance. Machines typically depend on some infrastructure, such as electrical power, network connectivity, etc. No infrastructure is 100% reliable, and the expectation of fault tolerance may dictate that operation of the machines continue smoothly (or, at least, that the machines halt gracefully) if some portion of the infrastructure fails.

One example of infrastructure that is subject to failure is the supply of electrical power. Computers and other machines depend on electrical power in order to operate. Many such machines are not able to handle an abrupt loss of power. For example, a computer may be in the middle of committing atomic operations (e.g., disk writes, state changes, etc.), which cannot easily be unwound if power is lost during the commit process. Even if the machine were able to deal with an abrupt loss of power, there may be quality of service issues (e.g., users' expectations that the machines will be running more often than not) that weigh against taking a machine out of service simply because a source of electrical power has been lost. Therefore, machines are often set up to use plural sources of power in the event that one source fails.

Mechanisms that may be used to provide plural sources of power are dual-cording and Uninterruptable Power Supplies (UPSs). With dual-cording, a machine receives power through two separate power cords, each connected to its own power converter within the machine. In normal operation, the machine draws half of its power from each cord/converter. If the power supplying one cord (or the converter in the machine) fails, the power draw is switched to the remaining cord, so the machine continues to operate while drawing full power through one of its cords. A UPS is another type of mechanism that helps to provide fault tolerance in the event of a power loss. A UPS connects a machine to an underlying power source (e.g., the utility power grid), while also providing a battery backup. Thus, if the grid power fails, the UPS continues to supply power, temporarily, from its battery.

One arrangement involving UPSs and dual-cording is to use two UPSs. In such an arrangement, one of a machine's cords is connected to one UPS, and the other order is connected to the other UPS. In normal operation, half the power load flows through each UPS, but if a UPS fails, then the remaining UPS picks up the full load. However, this design involves massive over-sizing of UPS capacity, since it involves maintaining UPSs that, collectively, can deliver at least twice as much power as would be used during normal operation. A group of servers in a data center may draw thousands of kilowatts of power. It may not be practical to double-size the UPS capacity for an entire group of servers.

SUMMARY

Machines may be connected to electrical power in a way that provides tolerance to electrical power disruptions, while using relatively little over-sizing of UPS capacity. Several power distribution units (PDUs) may be provided for a group of dual-corded machines. For example, there may be six PDUs for a group of thirty machines, although other numbers of machines and/or PDUs could be used. Each PDU may be connected to a UPS assigned to that group (the group's main UPS), which may have sufficient capacity to supply power to all of the machines in that group. Each PDU may also be connected to a reserve UPS, which may be shared among several machine groups and may act as common backup UPS for several groups. Each PDU for a group distributes power from that group's main UPS to the machines. Each PDU may also implement a static switch between the main and reserve UPSs, so that if a group's main UPS fails (or is taken off line intentionally), then each PDU may distribute power from the reserve UPS. The machines in the group receive power from the UPSs through the PDUs.

The machines in a group may be connected to that group's PDUs in a cross-over pattern. For example, if there are six PDUs (A through F) for thirty machines, then five machines may have their first cord connected to PDU-A, and then each of these five machines may have their second cord connected to a different one of PDU-B through PDU-F. Thus, the first machine may be connected to PDUs A and B, the second machine may be connected to PDUs A and C, and so on through the fifth machine (which may be connected to PDUs A and F). If PDU-A fails, the load is re-distributed more-or-less evenly across PDUs B, C, D, E, and F. Similarly, machines in the group may be connected in the pattern B-A, B-C, . . . B-F, so that if PDU-B fails, the load of these machines will be distributed across PDUs A, C, D, E, and F. Since each PDU assumes only a small part of the re-distributed load, fault-tolerance for a single PDU failure can be created by sizing each PDU so that its capacity is only a small amount more than its normal load. While the above example uses dual-corded machines, the cross-over pattern can also be used in certain single-corded contexts, such as in the case of a dual-corded rack with power panels that supply power to single-corded machines.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
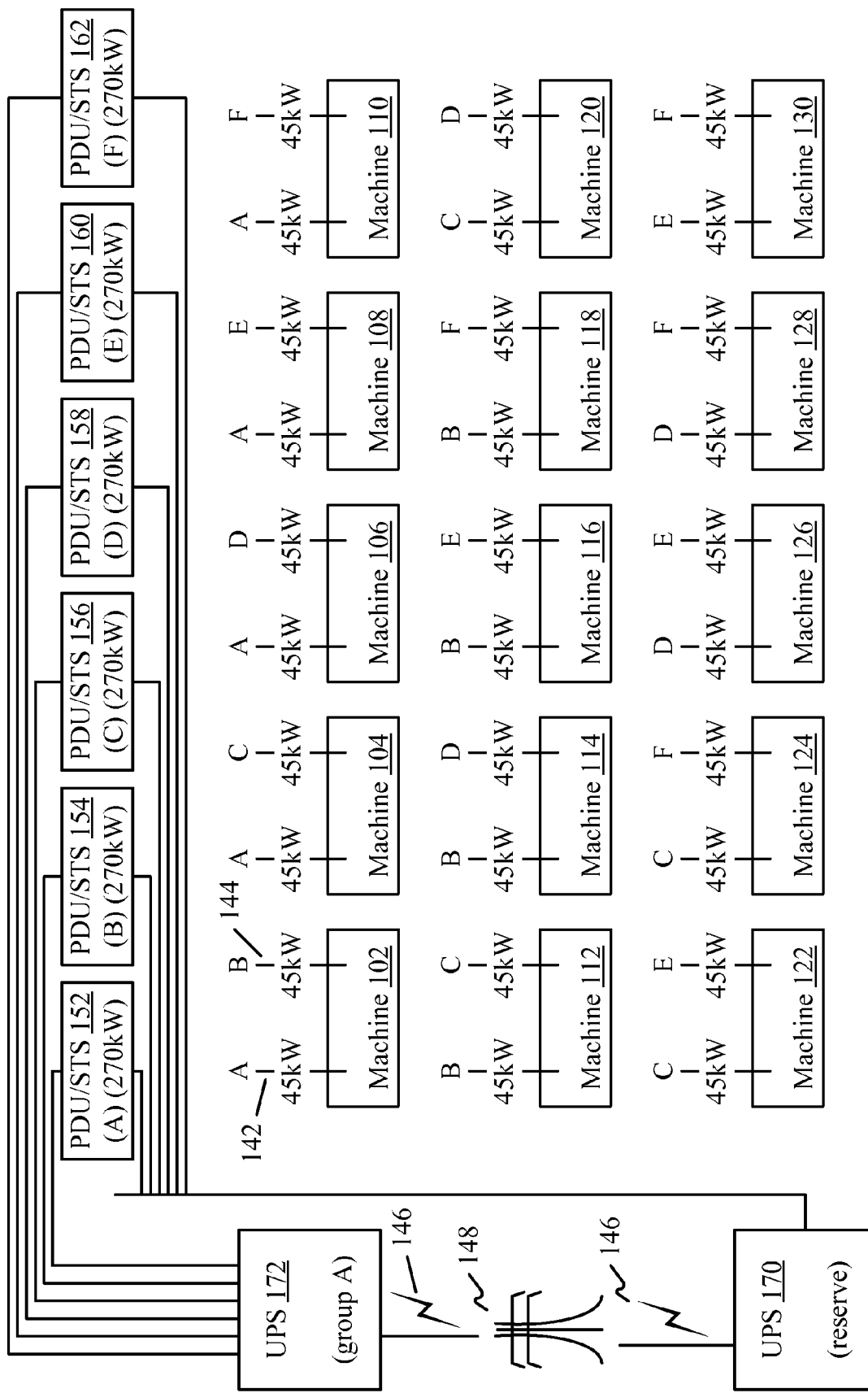
FIG. 1 is a block diagram of an example arrangement of machines that receive electrical power.

Data centers are often designed with some level of fault tolerance. There are various situations to which a commercial data center provides some resistance, such as fire, earthquake, burglary, etc. One fairly mundane problem that data center designers plan for is electrical disruption. The utility that serves the data center may have an interruption of electrical service. Or, a particular component of electrical hardware within the data center may be taken out of service for maintenance (or may fail), thereby causing a localized power outage within the data center. Many computers are not designed to handle abrupt power losses. Even if a computer can handle an abrupt power loss, data centers generally aim to meet some expectation of uptime. Taking computers out of service because power is not available through a particular channel may cause the data center not to meet the uptime expectation.

One simple scheme to build tolerance to power loss is dual-cording combined with UPSs. Thus, machines in data centers may be dual-corded, in the sense that they have two separate power inputs, each of which is individually capable of powering the entire machine. In normal operation, the machine draws half its power from each cord. If power fails to be delivered through one cord, the machine's entire load is shifted to the other cord. In such an arrangement, a group of machines is typically supported by two UPSs. The UPSs are situated between the machines and the power utility, so if the power utility fails, the UPS continue to provide power, temporarily, from a reserve such as a battery. The first cord of each machine is plugged into the first UPS, and the second cord of each machine is plugged into the second UPS. Thus, the UPSs guard against failure of service from the electric utility, and connecting each of a machine's two power cords to a different UPS guards against failure of one of the UPSs. Under this arrangement, however, each of the two UPS is, on its own, capable of providing full power to the machines, so this arrangement involves having twice as much UPS capacity as would be used in normal operation.

To avoid double-sizing UPS capacity, it is possible for each group of machines to have its own UPS, and then for several groups of machines to share a back-up UPS. This arrangement involves connecting the machines to the UPSs through PDUs and static switches, so that power can be switched from one UPS source to another in the event of failure. However, PDUs/static switches—like UPSs—may fail or may be taken out of service for maintenance. Thus, maintaining uptime in the event that a PDU/static switch fails or is taken out of service may involve double-sizing the PDU and/or static switch capacity for a group of machines.

The subject matter herein may allow a group of machines to connect to UPSs (or other power sources) through PDUs, while providing tolerance for loss of PDU service. This fault tolerance may be provided with relatively little over-sizing of the PDU capacity.

Turning now to the drawings, FIG. 1 shows an example arrangement of machines that receive electrical power. The components shown in FIG. 1 may be, or may be part of, a data center. In the example of FIG. 1, machine 102 is a dual-corded machine, which is capable of receiving its power from a first cord 142, from a second cord 144, or from any combination of cords 142 and 144. In the example of FIG. 1, machine 102 draws ninety kilowatts (kW) of power, of which it draws half from cord 142 and half from cord 144. Machines 104, 106, 108, 110, 112, 114, 116, 118, 120, 122, 124, 126, 128, and 130 are similarly arranged, such that each machine has two cords and draws half of its power from each cord. While FIG. 1 shows an example in which all machines are dual-corded machines that draw ninety kilowatts of power (45 kW from each cord), the subject matter described herein is not limited to these examples. Machines could draw any amount of power. The machines could all draw the same amount of power as each other (as shown in the example of FIG. 1), or different machines could draw different amounts of power. Moreover, while FIG. 1 shows an example of dual-corded machines, the machines could have any number of cords (one or more), and different machines may or may not have the same numbers of cords as each other.

It is noted that the concept of a machine, as used herein, encompasses any set of one or more devices that receive power. For example, any of the machines shown in FIG. 1 could be an individual computer, a collection of servers in a rack, or servers in a rack together with a remote power panel (RPP) that provides power to the rack. In one example, dual-corded servers are installed in a rack and the rack has two sets of outlets into which the cords of the servers are plugged. The RPP may have two sides, and each set of outlets in the rack may be powered by a different side of the RPP. In such a case, the "machine" may be collectively the rack, the servers in the rack, and the RPP that powers the rack, even though these components may be physically distinct. As described below, the machines of FIG. 1 are each connected to two separate power distribution units, and thus the notion of a machine encompasses any unit that can be connected to two power distribution units (regardless of whether such a unit is a single device, such as one computer, or a collection of devices, such as a set of servers in a rack and the RPP that provides power to the servers).

A plurality of power distribution units/static switches may be used to connect machines 102-130 to one or more sources of power. (A power distribution units/static switch may be abbreviated herein as a PDU/STS, or a PDU. However, a given component that is labeled as PDU or PDU/STS may act as a power distribution unit, as a static switch, or as both of these.) The example of FIG. 1 shows six PDU/STSs 152, 154, 156, 168, 160, and 162, although any number of PDU/STSs could be used. Each cord of machines 102-130 may be connected to a particular PDU/STS. In the terminology of FIG. 1, PDU/STS 152 is labeled "A", PDU/STS 154 is labeled "B", and so on. Thus, the letter "A" over cord 142 indicates that cord 142 is connected to PDU/STS 152, and the letter "B" over cord 144 indicates that cord 144 is connected to PDU/STS 154 (PDU/STSs 152, 154, etc., may sometimes be referred to herein as "PDU/STS A", "PDU/STS B", etc.).

Each of the PDU/STSs distributes power from one or more upstream sources. Moreover, each of the PDU/STSs implements a static switch that can change from one upstream source to another in case a particular upstream source fails. For example, each of PDU/STSs 152-162 is connected to two Uninterruptable Power Supplies (UPSs): UPS 170 and UPS 172. UPSs 170 and 172 are connected to utility power grid 148, and they deliver power 146 from grid 148 to downstream components, such as PDU/STSs 152-162. UPSs 170 and 172 also maintain power reserves (such as rechargeable batteries) that allow them to continue to deliver power downstream (at least temporarily) even if grid 148 ceases to deliver power. (Despite the term "uninterruptable power supply," it is possible that a UPS may cease to deliver power in situations such as battery failure, etc. Thus, devices that cease to deliver power for some reason may still be considered UPSs.)

In one example UPS 172 is assigned to a specific group of machines (such as machines 102-130), and UPS 170 is shared among different groups of machines as a reserve. (The use of different UPSs for different groups, and a reserve UPS shared among groups, is described more particularly below in connection with FIG. 2.) In such an example, PDU/STSs 152-162 may distribute power to machines 102-130 mainly from UPS 172, but may switch to UPS 170 in the event that power from UPS 172 is interrupted or drops below some threshold level.

PDU/STSs 152-162 may be subject to capacity limitations. In the example of FIG. 1, each of PDU/STSs 152-162 is capable of delivering 270 kW. However, the 270 kW capacity is merely an example, and PDU/STSs 152-162 could have any capacity (and may or may not have the same capacity as each other).

One challenge in designing a data center is to choose the size and arrangement of components in a way that provides some amount of fault-tolerance, without an excessive amount of unused capacity. The particular arrangement in which machines 102-130 are connected to PDU/STSs may be used to balance considerations of fault-tolerance and excess capacity. For example, as noted above, each of machines 102-130 may draw ninety kilowatts of power. In normal operation, each machine may draw forty-five kilowatts from each of its two cords. Thus, machine 102, in normal operation, draws forty-five kilowatts from PDU/STS A (through cord 142), and another forty-five kilowatts from PDU/STS B (through cord 144). However, a machine may be capable of drawing the full ninety kilowatts from a single cord. Thus, if cord 142 fails to supply power, machine 102 may draw ninety kilowatts through cord 144. There are various reasons for which a dual-corded machine's full load might be shifted to a single cord. One such reason is that each cord may be attached to a power transformer (or other type of converter) within the machine, and one of those transformers may fail, thus causing the load to be shifted entirely to the other transformer (and, therefore, to the other cord). However, another reason to shift the entire power load to one cord is that the PDU/STS supplying the other cord has failed. Thus, if PDU/STS A fails, the supply of power to cord 142 fails, and continued operation of machine 102 involves shifting cord 142's half of the ninety kilowatt load to cord 144.

If PDU/STS A fails (or is taken out service intentionally, such as in the case of preventative maintenance), then, in the example of FIG. 1, machine 102 is not the only machine that will have to draw power through a single cord. Machines 104, 106, 108, and 110 also draw power from PDU/STS A. Therefore, if PDU/STS A fails, each of the five machines 102-110 may continue to draw full power from its remaining cord. But if all five machines were connected to the same pair of PDU/STSs, then failure (or other interruption of service) by one PDU/STS would double the load on the other PDU/STS. E.g., if machines 102-110 all had their first cord connected to PDU/STS A and their second cord connected to PDU/STS B, then failure of PDU/STS A would double the load on PDU/STS B. So, in the example of FIG. 1, machines 102-110 are each connected to PDU/STS A through their first cord, but are each connected to a different one of PDU/STSs B-F through their second cord. (E.g., machines 102 and 104 are both have one connection to PDU/STS A, but their second connections are to two different PDU/STSs, B and C.) Under this connection scheme, if PDU/STS A fails, the load carried by machine 102's first cord is shifted to PDU/STS B, the load carried by machine 104's first cord is shifted to PDU/STS C, and so on. So, when PDU/STS A fails, the load on each of PDU/STSs B-F is increased by 45 kW. Without any PDU/STS failures, each PDU/STS, in the example of FIG. 1, normally supplies five cords at 45 kW each, but when PDU/STS A fails the remaining PDU/STSs B-F each supplies six cords at 45 kW each.

Thus, in the example pattern in which machines are attached to PDU/STSs in FIG. 1, tolerance for a single PDU/STS failure can be built by over-sizing each PDU/STS by 20% (as compared with the load that the PDU/STS carries without failure). Or, more precisely, if there are p PDU/STSs, tolerance for one PDU/STS to fail can be built by sizing each PDU/STS at $$\frac{1}{p-1}$$

of the total power draw across a group of machines. If there are m machines, each of which draws a load of w watts, then tolerance for a single PDU/STS failure can be built by giving each PDU/STS a capacity of $$\frac{m \cdot w}{p-1}$$

(or, if k is the total power draw for a group of machines, then the above capacity condition may be stated by the expression $$\left.\frac{k}{p-1}\right).$$

Thus, in normal operation each of PDU/STSs A-F carries the 45 kW load from five cords. 5×45 kw=225 kw, but a size of $$\frac{15 \times 90 \text{ kW}}{6-1} = 270 \text{ kW(or 20\% more than 225 kW)}$$

gives each PDU/STS the capacity to pick up an even share of the excess load in the event that one PDU/STS fails. Thus, a PDU/STS capacity at least $$\frac{m \cdot w}{p-1} \text{ watts}$$

but less than $$\frac{2mw}{p} \text{ watts}$$

provides tolerance for one PDU/STS to fail, while avoiding double-sizing of PDU/STS capacity. (Or, in the case where the power draw of a group of machines is stated as k rather than m·w, tolerance for one PDU/STS failure while avoiding double-sizing could be provided by PDU/STSs that have capacity of at least $$\frac{k}{p-1} \text{ watts}$$

but less than $$\left.\frac{2k}{p} \text{ watts.}\right)$$

In the example of FIG. 1, the pattern in which machines are wired to the PDU/STSs evenly distributes the different combinations of PDU/STSs across the machines. In particular, with p PDU/STSs, there are $$\binom{p}{2} = \frac{p(p-1)}{2}$$

different combinations of PDU/STSs to which a dual-corded machine could be connected. In the example of FIG. 1, there are six PDU/STSs, and therefore $$\binom{6}{2} = 15$$

different pairs of PDU/STSs. Since there are fifteen machines 102-130, it is possible for all fifteen combinations to be exhausted, such that each machine in a group is connected to a different combination of PDU/STSs than every other machine in the group. In such a case, any PDU/STS failure will cause the load carried by the failed PDU/STS to be evenly distributed to the remaining PDU/STSs. If PDU/STS A fails, then the 45 kW drawn by the "A" cord of each of the five machines will be shifted evenly to PDU/STSs B, C, D, E, and F. So, machine 102 would draw an extra 45 kW from PDU/STS B, machine 104 would draw an extra 45 kW from PDU/STS C, and so on. Similarly, if PDU/STS B fails, then machines 102, 112, 114, 116, and 118 will each draw an extra 45 kW from PDU/STSs A, C, D, E, and F, respectively. It is possible that the number of PDU/STSs and machines is such that redistribution of the load is not quite even. For example, if there are six PDU/STSs and fourteen machines, then instead of all PDU/STSs being connected to five machines, some PDU/STSs may be connected to five machines and others to four machines. In that case, load may be distributed across four PDU/STSs or five PDU/STSs, depending on which PDU/STS goes out of service and how the PDU/STSs are connected to the machines. (Conversely, if there are more than fifteen machines, the load of more than five machines may be re-distributed to some PDU/STSs in the event that a PDU/STS fails.) However, these considerations may be taken into account when sizing the PDU/STSs. (In general, if the combination of connections in a group of machines is distributed evenly throughout the space of possible pairs of PDU/STSs, then—in the event of a PDU/STS failure—power can be expected to redistribute evenly among remaining PDU/STSs.) Similarly, if machines draw power in different amounts, these considerations may also be taken into account when sizing the PDU/STSs.

Figure 2:
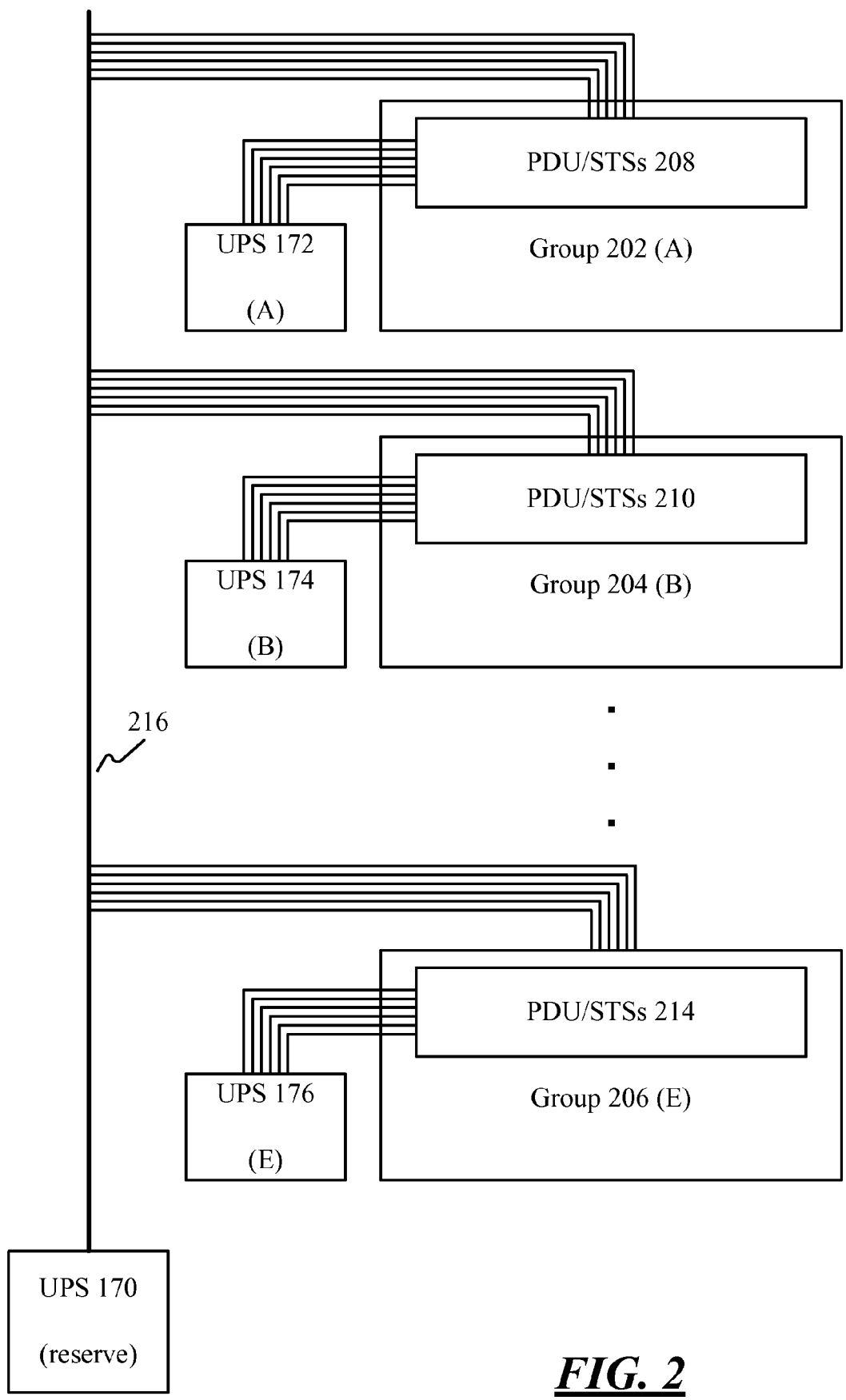
FIG. 2 is a block diagram of an example arrangement in which several groups of machines are connected to a reserve UPS.

As noted above, a group of PDU/STSs may have a UPS, and different groups may share a reserve UPS. FIG. 2 shows an example in which several groups of machines are connected to a reserve UPS.

FIG. 2 shows an arrangement in which there are several groups of machines, groups 202, 204, and 206. (The components shown in FIG. 2 may be, or may be part of, a data center.) As indicated by the letters next to each group, and by the vertical ellipsis, there may be five groups (A-F), although any number of groups could be present. Any number of machines could be present in a group. For example, machines 102-130 (shown in FIG. 1) may be the machines in group A, while other machines may be part of groups B through E.

Each machine may have one or more PDU/STSs, which distribute power to the machines in a group. Thus, group A has PDU/STS(s) 208, group B has PDU/STS(s) 210, and group E has PDU/STS(s) 214 (while groups C and D, as represented by the vertical ellipsis, may each have a set of one or more PDU/STS(s)). As one example, PDU/STS(s) 208 may include PDU/STSs 152-162 (shown in FIG. 1).

Each of groups A-E may be associated with a UPS. For example, UPS 172 (also shown in FIG. 1) may be the UPS for group A, UPS 174 may be the UPS for group B, and UPS 176 may be the UPS for group E. (Groups C and D, as represented by the vertical ellipsis, may each have its own UPS.) There may be a reserve UPS 170 (which is also shown in FIG. 1), which acts as a reserve for the various groups. Each of the PDU/STSs may be connected to the UPS for its own group, and may also be connected to reserve UPS 170 through power bus 216. In the example of FIG. 2, there are six PDU/STSs in each group, and thus each of the boxes representing PDU/STSs 208, 210, and 214 shows six lines connecting to the UPS for a particular group, and six lines connecting to power bus 216. (FIG. 1 shows some example detail of this connection, where each PDU/STS is individually connected to the UPS for a group and to the reserve UPS.) As discussed above in connection with FIG. 1, each PDU/STS may distribute power from either the main UPS for a particular group, or from the reserve UPS, based on whether or not the main UPS is continuing to deliver power at some threshold level.

Since groups A-E each have access to reserve UPS 170, over-sizing of the UPS capacity for each group may be avoided. Thus, for example, the capacity of UPS 172 may be set equal (or approximately equal) to the maximum expected power draw of the machines in group A, the capacity of UPS 174 may be set equal (or approximately equal) to the maximum expected power draw of the machines in group B, and so on. By giving UPS 170 sufficient capacity to take over for any of the groups' main UPSs in the event of failure, the groups may be able to share UPS 170 as a reserve. For example, if the maximum power draw of any of the groups is 1000 kW, then providing UPS 170 with a capacity of 1000 kW allows the reserve UPS to take over for any of the groups' main UPS, in the event that a main UPS fails.

Thus, referring to FIGS. 1 and 2, the switching capability of the PDU/STSs allows different groups of machines to share reserve UPS capacity without having to double-size the UPS capacity for a given group, and the pattern in which dual-corded machines are connected to the PDU/STSs makes the machines tolerant to a PDU/STS failure with relatively little over-sizing of the PDU/STS capacity. Thus, the arrangements of FIGS. 1 and 2 (or any one or more features of those arrangements) may allow some fault tolerance with relatively little over-sizing of either PDU/STS capacity or UPS capacity.

Figure 3:
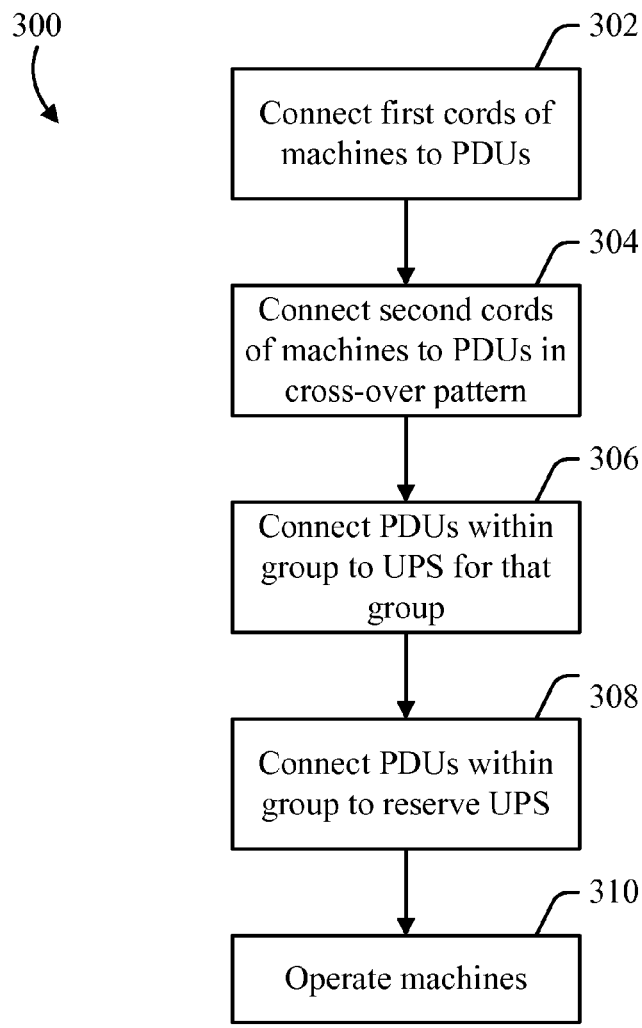
FIG. 3 is a flow diagram of an example process of connecting machines to power sources.

FIG. 3 shows, in the form of a flow diagram, a process 300 of connecting machines to power sources. Before turning to a discussion of process 300, it is noted that process 300 may be used to create the arrangements shown in FIGS. 1 and 2, but could be used in any context or to create any arrangement. Additionally, the flow diagrams herein (both in FIG. 3 and in FIG. 6) show examples in which stages of a process are carried out in a particular order, as indicated by the lines connecting the blocks, but the various stages shown in these diagrams may be performed in any order, or in any combination or sub-combination.

At 302, the first cords of a group of machines may be connected to the PDU/STSs for that group. For example, with reference to the machines in FIG. 1, the first cords of machines 102-110 are all connected to PDU/STS A, the first cords of machines 112-118 are all connected to PDU/STS B, and so on. At 304, the second cords of a group of machines may be connected to the PDU/STSs for that group in order to form a pattern in which different combinations of PDU/STSs occur across the group. Such a pattern may be referred to as a cross-over pattern.

At 306, the PDU/STSs for a group may be connected to the UPS for that group. For example, with reference to FIG. 1, PDU/STSs 152-162 may be connected to UPS 172, which is assigned to the group of machines that are served by PDU/STSs 152-162. At 308, the PDU/STSs for a group may also be connected to a reserve UPS, such as UPS 170. For example, PDU/STSs 152-162 (shown in FIG. 1) may be connected to power bus 216 (shown in FIG. 2), in order to connect the PDU/STSs to reserve UPS 170. As discussed above, the PDU/STSs may draw from UPS 172 as their main source of power, but may switch to UPS 170 in the event that UPS 172 fails or is taken out of service.

At 310, the machines in the group are operated. For example, if the machines in a group form a data center, a server farm, etc., the machines may be operated to perform that function. The machines may operate using the power structure created at 302-308.

Figure 4:
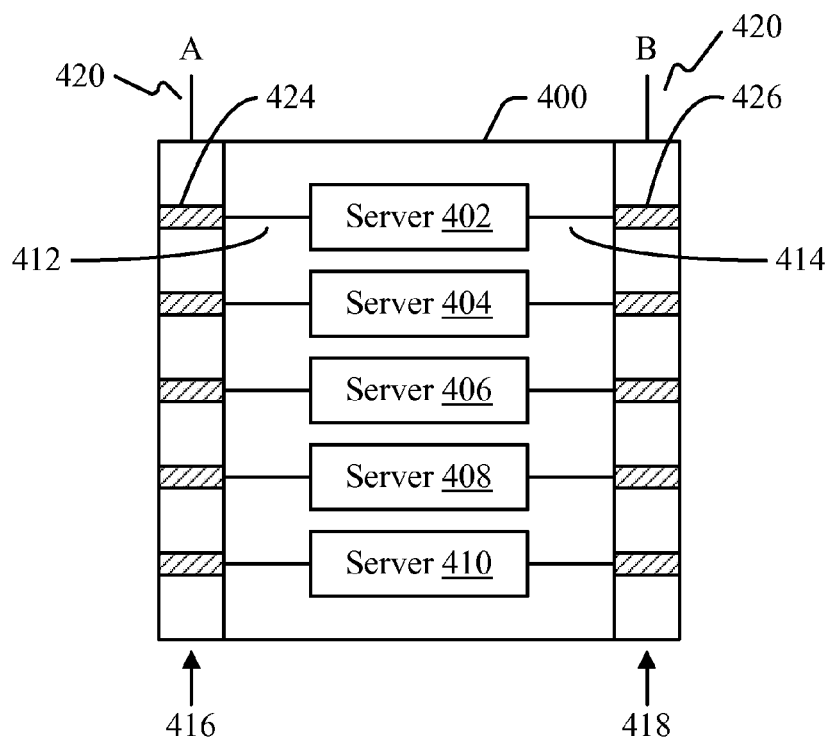
FIG. 4 is a block diagram of an example rack in which servers may be installed.

The discussion above refers to various wiring arrangements that may be used to provide power to machines. The particular types of machines that are wired could take any form. In one example, each machine is a self-contained computer, such as a server computer. However, the machine could be a rack that aggregates several computers and provides a power source for those computers. FIG. 4 shows an example of such a rack.

Rack 400 contains may be a device that contains space in which one or more server computers are installable, and rack 400 also may have mechanisms to provide power to those computers. For example, rack 400 stores servers 402, 404, 406, 408, and 410. Each of servers 402-410 is a computer, which may have components such as processor(s), disk(s), network interface(s), etc. In the example of FIG. 4, each of servers 402-410 is dual corded. In other words, each of servers 402-410 has two separate power cords, each of which may be separately capable of powering the entire server. Each cord may be connected to a separate transformer (or other power converter) within the server, so that the server may operate in the event that either a cord, the flow of power to a cord, or a converter, fails. Thus, server 402 has two separate power cords 412 and 414. Two power cords are similarly shown for each of servers 404-410 (although the power cords for those servers are not marked with reference numerals).

Rack 400 has two separately-powered panels to which servers 402-410 may be connected. Each of the panels is connected through a cord to the power source. Thus, panel 416 is connected to PDU/STS A through cord 420, and panel 418 is connected to PDU/STS B through cord 422. (PDU/STSs A and B are shown in FIG. 1. The connection to PDU/STSs A and B is shown by the letters "A" and "B", respectively, on top of cords 420 and 422.) Each of panels 416 and 418 may provide one or more electrical connection points (e.g., power outlets, etc.), through which a server (or other machine) could be powered. For example, panel 416 provides connection point 424 and panel 418 provides connection point 426. Server 402 is connectable (e.g., plugged into) panel 416 at connection point 424, and into panel 418 through connection point 426. Servers 404-410 are similarly connectable to panels 416 and 418 through additional connection points on panels 416 and 418 (which are shown by slanted-line patterns similar to connection points 424 and 426). Panels 416 and 418 may be connected to power sources through a remote power panel (RPP). Thus, panels 424 and 426 may be the components of rack 400 that cords of servers are plugged into, and panels 424 and 426 may each receive their power by being connected to different sides of an RPP. An RPP is normally a separate component from a rack. However, to the extent that the "machines" represent units that may be dual corded and connected to PDU/STSs in the manner shown and describes herein, a rack and the RPP that powers it may be viewed as being part of a machine.

Rack 400 is an example of a dual-corded machine (e.g., machine 102, shown in FIG. 1) that may be connected to PDU/STSs. However, rack 400 is only one example of such a machine. For example, a server (e.g., server 402) is another example of a machine. Thus, while FIG. 4 provides a specific example of one of the machines shown in FIG. 1, each of the machines shown in FIG. 1 could be any type of device, such as a computer (e.g., server 402), an aggregator of one or more computers (e.g., rack 400), or any other type of device. (And, as noted above, "machine" may include the rack, the servers in the rack, and the RPP through which the rack receives power.)

Figure 5:
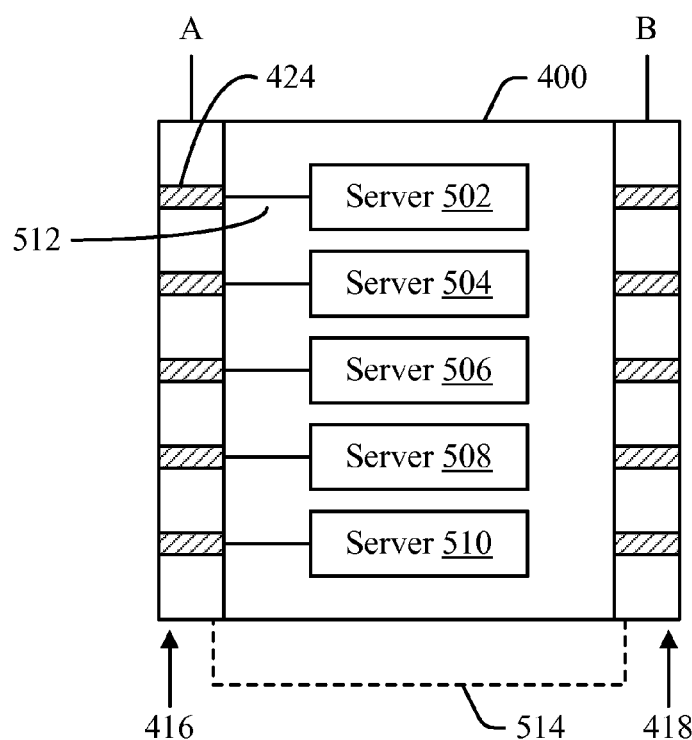
FIG. 5 is a block diagram of an example rack in which single-corded servers are installed.

While FIG. 4 shows the use of rack 400 with dual-corded servers, rack 400 could also be used with single-corded servers. FIG. 5 shows an example use of rack 400 with single-corded servers. In FIG. 5, rack 400 has panels 416 and 418, including connection points (e.g., connection point 424) shown by slanted-line patterns. One or more servers (e.g., servers 502, 504, 506, 508, and 510) are connected to rack 400 through panel 416. Example servers 502-510 are single-corded, in the sense that each server is able to receive power through one cord. Thus, server 502 receives power through cord 512, which is connected to connection point 424 on panel 416. (Servers 504-510 may also each receive power through a single cord, as shown.) Panels 416 and 418 are connected to PDU/STSs A and B, as described above. Since servers 502-510 are not connected directly to panel 418, if PDU/STS A ceases to deliver power to rack 400, server 502 may cease to receive power. However—even if servers 502-510 do not have dual corded capability—by installing servers 502-510 in a dual-corded rack, power may be restored to servers 502-510 by making a crossover connection 514 between panel 416 and panel 418. Thus, as long as PDU/STS B continues to deliver power, crossover connection 514 may carry power from panel 418 to panel 416, so that servers 502-510 (which continued to be connected to panel 416) may resume receiving power. (The cross-over connection might be made, for example, at the RPP that powers rack 400.) Thus, in the configuration shown in FIG. 5, even though servers 502-510 are single-corded, installing those servers in a dual-corded rack that is connected to PDU/STSs and/or UPSs as described herein may help to maintain uptime of those servers.

Figure 6:
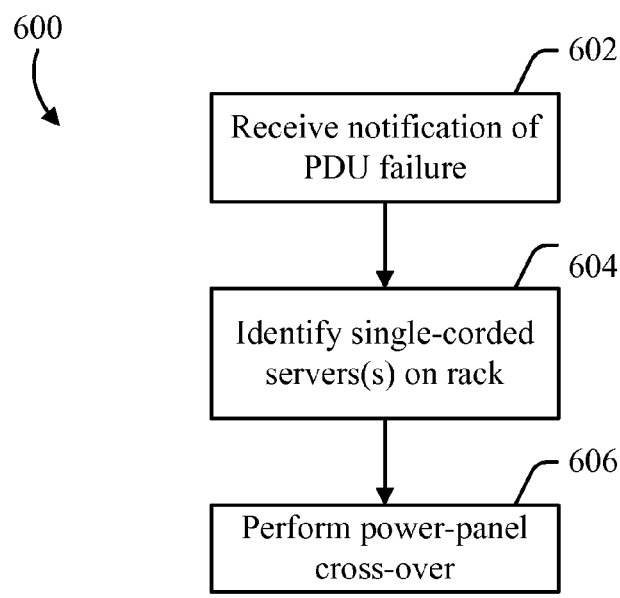
FIG. 6 is a flow diagram of an example process in which power may be restored to servers.

FIG. 6 shows an example process 600 in which single-corded servers connected to a dual-corded rack may have power restored. At 602, a notification of a PDU/STS failure may be received. The notification could be received in any manner. For example, a data center administrator might receive notification of a PDU/STS failure through monitoring software or some other mechanism that is used to monitor the operation of the data center. At 604, for a given rack that was served by the failed PDU/STS, the single-corded servers on that rack may be identified. (FIG. 5 above shows an example in which all of the servers on a given rack are single-corded, but a rack could have a mixture of single-corded and dual-corded servers, and those servers that are single-corded could be identified at 604.) At 606, a power-panel cross-over may be performed in order to restore power to the single-corded servers. For example, connection 514 (shown in FIG. 5) may be put in place to implement an electrical cross-over from a panel with power to a panel without power.

Figure 7:
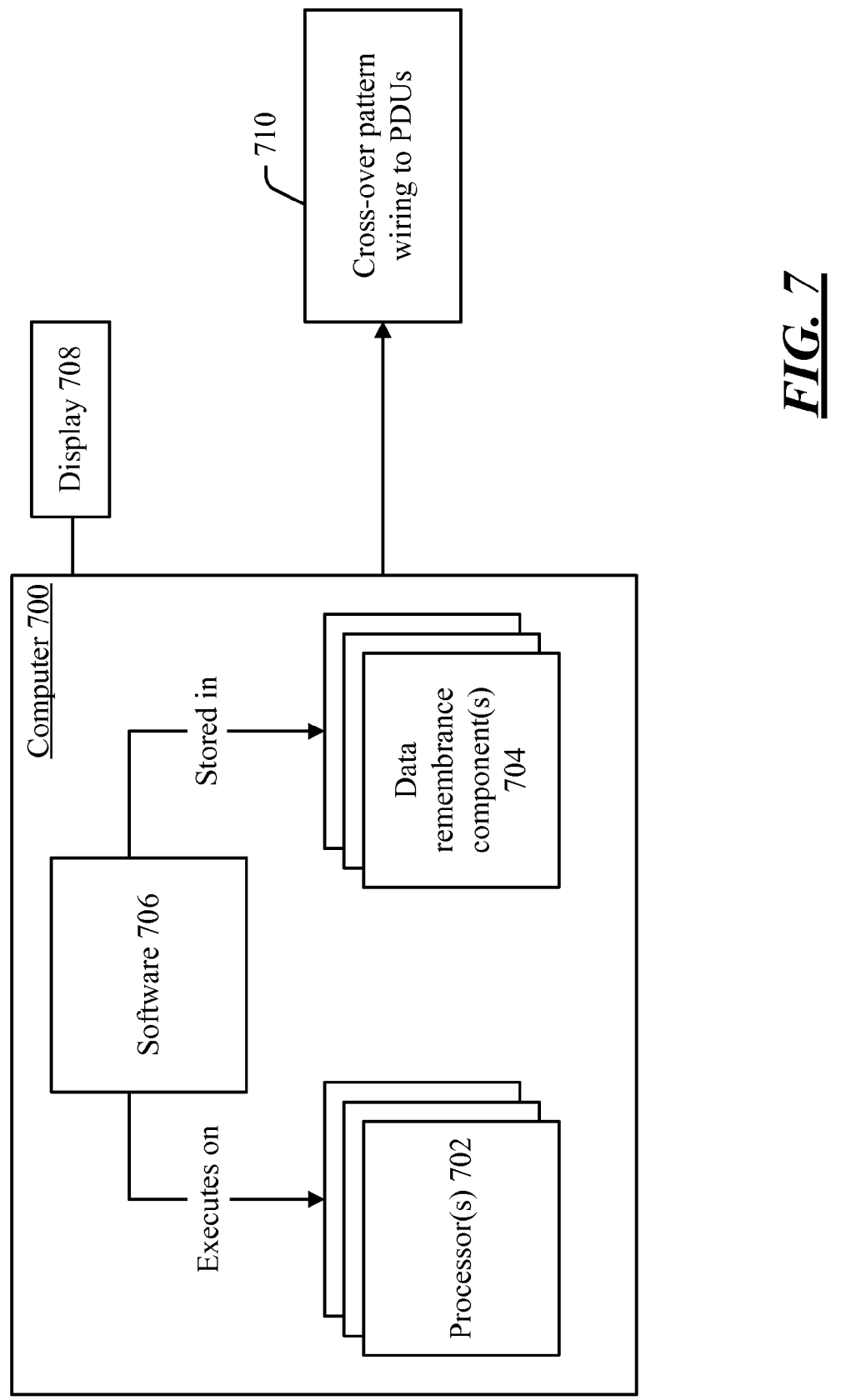
FIG. 7 is a block diagram of example components that may be used in connection with implementations of the subject matter described herein.

FIG. 7 shows an example environment that may relate to deployment of the subject matter described herein. The computer shown in FIG. 7 is an example of a machine that could be powered using techniques and/or mechanisms described herein. Additionally, processes described herein could be performed with the aid of a computer, such as that shown in FIG. 7.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 708, which may be a cathode ray tube (CRT) monitor, a liquid crystal display (LCD) monitor, or any other type of monitor. Computer 700 may have cross-over pattern wiring to PDU/STSs (block 710), where such wiring is implemented using some or all of the techniques and/or structures shown and described in connection with FIGS. 1-6.

Software 706 may be stored in the data remembrance component(s) 704, and may execute on the one or more processor(s) 702. Software 706, which may implement some or all of the functionality described above in connection with FIGS. 1-6, or may implement any other type of functionality. Software 706 may be implemented, for example, through one or more components, which may be components in a distributed system, separate files, separate functions, separate objects, separate lines of code, etc. A computer in which a program is stored on hard disk, loaded into RAM, and executed on the computer's processor(s) typifies the scenario depicted in FIG. 7, although the subject matter described herein is not limited to this example.

A process may be implemented as software that is stored in one or more of the data remembrance component(s) 704 and that executes on one or more of the processor(s) 702. For example, a process could be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium. In one example, computer 700 may implement a server function (e.g., a web server, a file server, etc.), and may contain software to perform such functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A data center comprising:
a plurality of power distribution units that distribute power from an upstream source;
a first group of machines, each of the machines having a first power cord and a second power cord, the first power cord and second power cord of a given machine being connected to two separate ones of said power distribution units, said first group comprising a first machine and a second machine, said first machine and said second machine each being connected to a first power distribution unit, said first machine also being connected to a second power distribution unit, said second machine also being connected to a third power distribution unit that is not said second power distribution unit;
a first uninterruptable power supply to which said power distribution units are connected; and
a second uninterruptable power supply to which said power distribution units are connected, each of said power distribution units distributing power from either said first uninterruptable power supply or from said second uninterruptable power supply based on whether power from said first uninterruptable power supply fails or has dropped below a threshold level, said second uninterruptable power supply being connected to a plurality of groups of machines other than said first group of machines, each group of machines having its own uninterruptable power supply other than said second uninterruptable power supply, said first group of machines and said plurality of groups of machines sharing said second uninterruptable power supply as their single reserve uninterruptable power supply in an event that a group's own uninterruptable power supply fails.

2. The data center of claim 1, wherein there are n of said power distribution units and ($_2^n$) machines in said first group, and wherein the first power cord and the second power cord of each machine in the first group are connected to a different combination of said power distribution units from any other machine in the first group.

3. The data center of claim 1, further comprising:
a second group of machines, wherein said second uninterruptable power supply that provides reserve power capacity for both said first group of machines and said second group of machines, said power distribution units being connected to said second uninterruptable power supply and providing power from said second uninterruptable power supply in an event that said first uninterruptable power supply fails or power from said first uninterruptable power supply drops below a threshold level.

4. The data center of claim 1, wherein said first machine comprises a computer that comprises two power cords.

5. The data center of claim 1, wherein said first machine comprises a rack into which a server is installable, said rack having a first panel that draws power through a first power cord and a second panel that draws power through a second power cord.

6. The data center of claim 5, wherein said server has two power cords, one of which is connected to said first panel, another of which is connected to said second panel.

7. The data center of claim 5, wherein said server has one power cord which is connected to said first panel and not to said second panel.

8. The data center of claim 1, each of said power distribution units being connected to said first uninterruptable power supply and also being connected to a power bus that is connected to said second uninterruptable power supply, each group in said plurality of groups of machines having a plurality of power distribution units that are connected both to a given group's own uninterruptable power supply and to said power bus.

9. The data center of claim 1, wherein said second uninterruptable power supply acts solely as a reserve uninterruptable power supply to provide power to said first group of machines or any of said plurality of groups of machines in an event in which said first uninterruptable power supply or said plurality of groups' own uninterruptable power supplies fails.

10. A method of powering machines, the method comprising:
    connecting first cords of a first group of machines to power distribution units;
    connecting second cords of said first group of machines to said power distribution units, a first one of said machines being connected to a different combination of said power distribution units than a second one of said machines;
    connecting said power distribution units to a first uninterruptable power supply, said first uninterruptable power supply providing power to said first group of machines and not to any other group of machines;
    operating said first group of machines under said power, wherein said first group collectively draws k kilowatts of power, wherein there are p of said power distribution units, and wherein each of said power distribution units has a capacity that is at least $k/(p-1)$ and is less than $2k/p$; and
    connecting said power distribution units to a second uninterruptable power supply that is shared between said first group of machines and at least one other group of machines, said power distribution units distributing power to said first group of machines from said first uninterruptable power supply unless power from said first uninterruptable power supply fails or drops below a threshold level in which case said power distribution units switch to distributing power from said second uninterruptable power supply, said first group of machines and said at least one other group of machines having its own uninterruptable power supply other than said first uninterruptable power supply and said second uninterruptable power supply, said first group of machines and said at least one other group of machines sharing said second uninterruptable power supply as their single reserve uninterruptable power supply in an event that a group's own uninterruptable power supply fails.

11. The method of claim 10, wherein each of the machines in said first group comprises a rack in which a server is installable, said rack having a first cord connected to a first one of the power distribution units and a second cord connected to a second one of the power distribution units.

12. The method of claim 11, wherein said rack comprises a first panel that provides power from said first cord and a second panel that provides power from said second cord, wherein said server has two cords, one of which is connected to said first panel and another of which is connected to said second panel.

13. The method of claim 11, wherein a first rack, which is among said group of machines, comprises a first panel that provides power from said first cord and a second panel that provides power from said second cord, wherein said server is connected to said first panel and not to said second panel, and wherein the method further comprises:

receiving notification that one of said power distribution units, to which said first rack is connected at its first panel, has failed; and
    performing a cross-over to connect said first panel of said first rack to receive power from said second panel of said first rack.

14. The method of claim 10, said power distribution units being connected to said first uninterruptable power supply and to a power bus that is connected to said second uninterruptable power supply, each group in said other group of machines having a plurality of power distribution units that are connected both to a given group's own uninterruptable power supply and to said power bus.

15. A system comprising:
    a plurality of power distribution units that are each connected to a first uninterruptable power supply and to a second uninterruptable power supply, said power distribution units drawing power from said first uninterruptable power supply and switching to said second uninterruptable power supply in an event in which power from said first uninterruptable power supply fails or drops below a threshold; and
    a plurality of dual-corded machines, each of the dual-corded machines being connected to a pair of the power distribution units, where different pairs of power distribution units are represented across the plurality of dual-corded machines in even distribution, each of the dual-corded machines drawing power from both power distribution units to which it is connected,
    wherein there are p power distribution units and m machines that each draw w watts of power, and wherein each power distribution unit has a capacity that is at least $(m \cdot w)/(p-1)$ and less than $2mw/p$, said second uninterruptable power supply also being connected to a plurality of groups of machines other than said plurality of dual-corded machines, each one of said groups of machines having its own assigned uninterruptable power supply other than said first uninterruptable power supply and said second uninterruptable power supply, said first group of machines and said plurality of groups of machines sharing said second uninterruptable power supply as their single reserve uninterruptable power supply to be used in an event that the assigned uninterruptable power supply for a given group fails.

16. The system of claim 15, wherein there are p power distribution units and $\binom{p}{2}$ dual-corded machines, and wherein each of the dual-corded machines is connected to a different pair of the power distribution units.

17. The system of claim 15, wherein each machine draws w/2 watts when the machine draws power from both of its cords, and wherein each machine is able to draw w watts of power through one cord in the event that the machine's other cord does not supply power.

18. The system of claim 15, wherein each of the machines comprises a rack that comprises two power panels, a server being installable into said rack and being connectable to one or more of the power panels.

19. The system of claim 15, said power distribution units being connected to said first uninterruptable power supply and to a power bus that is connected to said second uninterruptable power supply, each group in said plurality of groups of machines having a plurality of power distribution units that are connected both to a given group's assigned uninterruptable power supply and to said power bus.

* * * * *